July 17, 1923.
J. McMULLEN
THEFT PREVENTING DEVICE FOR AUTOMOBILES
Filed Aug. 20, 1921
1,462,118
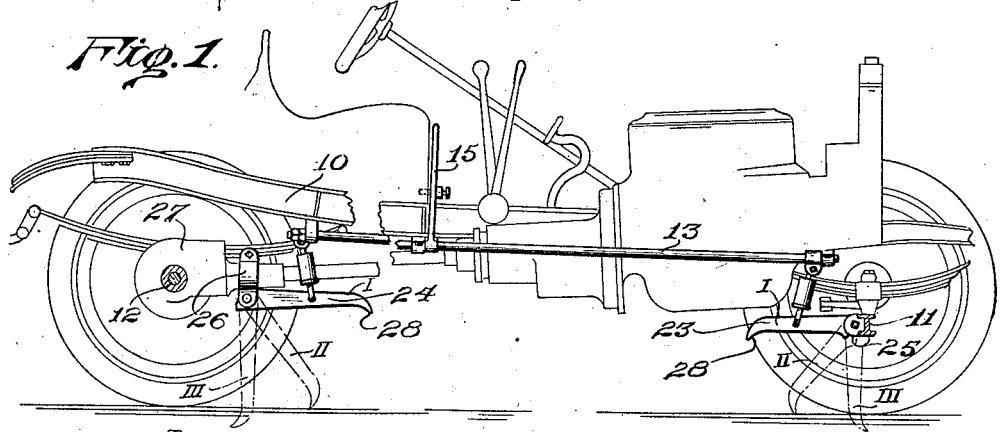
Fig. 1.
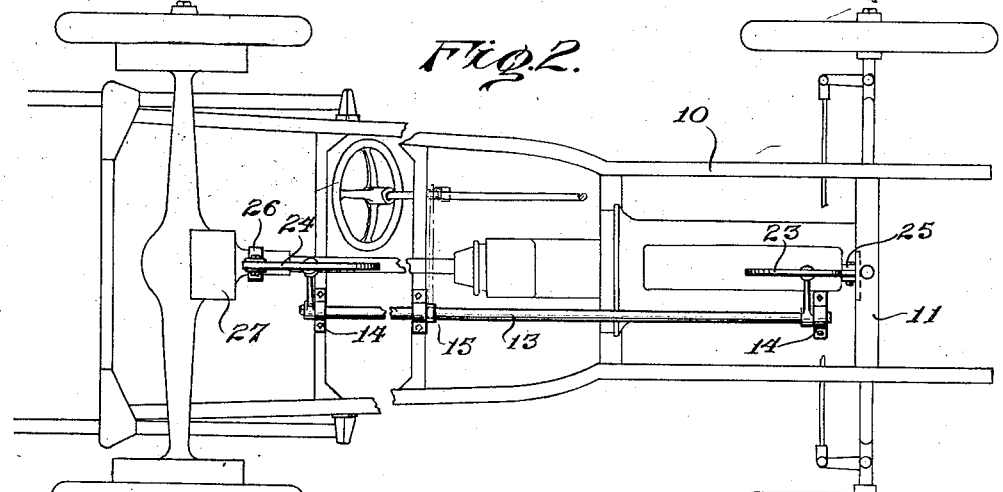
Fig. 2.
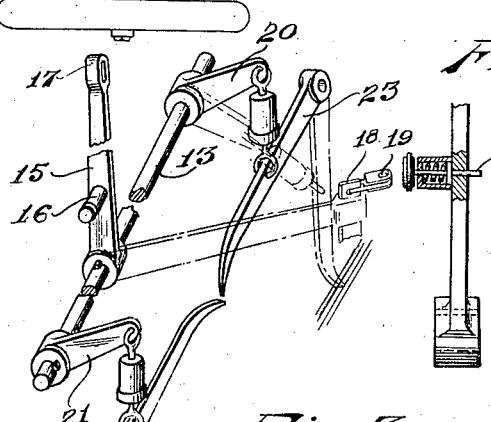
Fig. 4.
Fig. 3.
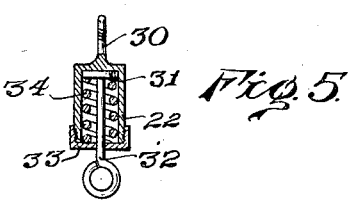
Fig. 5.
Inventor
John McMullen
By Lacey & Lacey, Attorneys Patented July 17, 1923.

1,462,118

UNITED STATES PATENT OFFICE.

JOHN McMULLEN, OF BUTTE, MONTANA.

THEFT-PREVENTING DEVICE FOR AUTOMOBILES.

Application filed August 20, 1921. Serial No. 493,976.

*To all whom it may concern:*

Be it known that I, JOHN MCMULLEN, a citizen of the United States, residing at Butte, in the county of Silver Bow and State of Montana, have invented certain new and useful Improvements in Theft-Preventing Devices for Automobiles, of which the following is a specification.

My invention relates to a device for preventing theft of automobiles. The object of the invention is to provide means of simple construction which are easily attached to any make of automobile for preventing the car from being stolen even if the engine were started to move either forward or backward.

The device is actually a brake or check for the automobile and is made operative when the motor is started for moving the automobile.

One advantage of the invention resides in its ease of operation, the parts being housed in idle position during the running of the car; and it requires only the throwing of a lever and securing it in new position by means of a lock, for setting the device in readiness for action. After that, the device works automatically and is actually made to operate by the thief himself when attempting to start the machine.

One embodiment of the device is illustrated in the accompanying drawing which shows in Figure 1 the side elevation of an automobile with my invention attached;

Figure 2 is a bottom plan view of Figure 1;

Figure 3 is a perspective view of the principal parts of the invention ready for attachment on an automobile;

Figure 4 is a partial section of the operating lever for the device with a latch arrangement; and Figure 5 is an axial section in larger scale of a flexible connection for the device.

In the drawing the automobile frame is denoted by reference numeral 10, the front axle by 11, and the rear axle by the numeral 12. A longitudinal shaft 13 is carried in suitable bearings 14 secured to the underside of the frame 10. This shaft 13 carries, near its middle, the lever 15 keyed to the shaft. This lever extends upwardly through the floor of the car and is provided with a spring latch 16 for engaging in a suitable recess in the body of an automobile when the lever 15 is in its upright or inoperative position.

The lever 15 has about 90° throw downwardly and upon reaching its lowermost position, it is adapted to engage, my means of an eye 17 thereon, with a staple 18 provided in the floor of the car and securely locked thereto by means of any kind of suitable lock 19.

Two cranks 20 and 21 are rigidly secured by means of a key at each end of the shaft 13 and a spring box 22 connects each crank 20 and 21 with respective arms 23 and 24. Arm 23 is journaled in a bearing 25 attached to the front axle 11 of the automobile in such a manner that the axis of the journal is parallel to the axis of the wheels but mounted eccentrically thereto.

The rear arm 24 is similarly mounted adjacent the rear wheel axle 12 by means of a bearing 26 which may be securely attached to the gear box 27. As both arms have their journals below the axis of the wheel shafts, it will easily be realized that when the arms 23 and 24 are made to swing downwardly, they will at a certain position contact with the ground, and if the swinging is continued the arms will be compelled to enter the ground or slightly lift the wheels from the roadway, depending on the hardness of the latter.

From Figure 1 it will be seen that with the arms 23 and 24 in the horizontal position I, that is when both arms lie almost horizontally, their free ends point downwardly with their claw-like formation 28 at the end. As the journal of arm 23 is on the back of the axle 11 and the journal of arm 24 is situated in front of the rear axle 12, the claws of the arms will point in opposite directions when the arms are let down to the ground, so that the claw on the arm 23 points forward while the claw on arm 24 points rearward.

The box 22 is preferably constructed as a socket with an upward eyelet 30 and containing a piston 31 with a piston rod 32 extending downwardly through the box. A screw cap 33 closes the lower end of the socket and between this cap and the piston is a coil spring 34 which, at its upper end, abuts against the piston 31. This spring is given a certain strength which should be enough for sustaining the weight of the corresponding arms 23 and 24.

It should be noted that instead of only one arm at the forward end and one at the rear end, two or more may be provided if thought necessary, but all the arms will be simultaneously lifted and lowered by means of the lever 15.

The operation of the device is as follows:

When the operator of the car is going to leave it for some time and after the motor has been stopped, he turns lever 15 from its upright to its horizontal position after first having released it by drawing out the latch pin 16. He thereupon locks the lever 15 to the staple 18 by means of lock 19 and can now leave the car without danger of its being stolen during his absence. When the lever 15 is turned, shaft 13 and cranks 20 and 21 turn with it, thereby lowering arms 23 and 24 into position II, see Figure 1. It will now be noted that the claws of the arms 23 and 24 are just resting on the ground but have so far not entered it. If it now should happen that somebody that has no right to use the car should attempt to start it, and set the motor in motion, the arm 24 which up to now has been resting in position II with its claw 28 upon the ground, will then pierce the latter and get a good grip therein as in position III so that the driving wheels will have no power to push the car forward. Should on the other hand an attempt be made to back the car, the same thing happens with the front arm, which now goes into the ground and takes the upright position III with its claw dug deeply into the roadway. During the swinging of the arms 23 and 24 from position II into position III the lever 15, shaft 13 and cranks 20 and 21 do not move but the additional swinging is permitted through the compression of spring 34 in box 22. When the spring 34 is compressed solid, the arms 23 and 24 reach the end of their swing and the box 22 becomes like a solid unyielding link. The extension of the box 22 is made to correspond to the angular difference between positions II and III of the arms 23 and 24, so that they cannot pass beyond this position. As the car cannot move forward or rearward, any attempt to steal it will be prevented in this manner and the car will be safe where it is left.

Having thus described the invention what is claimed as new is:

1. A brake for automobiles, comprising a swinging arm having a journal mounted parallel with, and eccentrically to, the wheel axle and below said axle, a lever journaled on the frame of the automobile to swing transversely to the length direction of the automobile, said lever having an inoperative and an operative position, a connection between said lever and said arm for giving said arm a limited angular movement, the end of said arm extending beyond the periphery of the wheel.

2. A brake for automobiles, comprising a swinging arm having a journal mounted parallel with, and eccentrically to, the wheel axle and below said axle, a lever journaled on the frame of the automobile to swing transversely to the length direction of the automobile, said lever having an inoperative and an operative position, a connection between said lever and a medial portion of said arm for giving said arm a limited angular movement, said connection including means for allowing additional angular movement to said arm, the end of said arm extending beyond the periphery of the wheel.

3. A brake for automobiles, comprising a swinging arm having a journal mounted parallel with, and eccentrically to, the wheel axle and below said axle, a lever journaled on the frame of the automobile to swing transversely to the length direction of the automobile, said lever having an inoperative and an operative position, a connection between said lever and a medial portion of said arm for giving said arm a limited angular movement, said connection including means for allowing additional angular movement to said arm, and means for locking said lever in each of said positions, the end of said arm below said medial portion extending beyond the periphery of the wheel.

4. A theft preventing device for automobiles comprising a shaft mounted to revolve in bearings on the frame of the automobile with its axis in longitudinal direction of the automobile, a lever secured on said shaft adapted to swing from an operative to an inoperative position, and means for locking the lever in each of said positions, a pair of cranks extending to one side of said shaft in approximately 90° to said lever, an arm journaled to the rear of and below the axis of the front wheels and a similar arm journaled in front of and below the axis of the rear wheels of the automobile, and a link connection between said arms and said cranks, the ends of said arms extending beyond the periphery of the wheels.

5. A theft preventing device for automobiles comprising a shaft mounted in bearings on the frame of the automobile with its axis in longitudinal direction of the automobile, a lever secured on said shaft adapted to swing from an operative to an inoperative position, and means for locking the lever in each of said positions, a pair of cranks extending to one side of said shaft in approximately 90° to said lever, an arm journaled to the rear of and below the axis of the front wheels and a similar arm journaled in front of and below the axis of the rear wheels of the automobile, and a link connection between said arms and said cranks, said link connection comprising a socket and a piston and a spring inserted between said socket and piston and adapted to shorten the length of said connection, the ends of said arms extending beyond the periphery of the wheels.

6. A theft preventing device for automobiles comprising a shaft mounted in bearings on the frame of the automobile with its axis in longitudinal direction of the automobile, a lever secured on said shaft adapted to swing from an operative to an inoperative position, and means for locking the lever in each of said positions, a pair of cranks extending to one side of said shaft in approximately 90° to said lever, an arm journaled to the rear of and below the axis of the front wheels and a similar arm journaled in front of and below the axis of the rear wheels of the automobile, and a link connection between said arms and said cranks, said link connection comprising a socket and a piston and a spring inserted between said socket and piston and adapted to shorten the length of said connection, said arms being provided with claws pointing downwardly when said arms are in their housed positions, said claws extending beyond the periphery of the respective wheels.

In testimony whereof I affix my signature.

JOHN McMULLEN. [L. S.]